United States Patent
Baba et al.

(10) Patent No.: US 6,984,060 B2
(45) Date of Patent: *Jan. 10, 2006

(54) VEHICLE HEADLAMP APPARATUS AND METHOD OF SETTING OPTICAL AXIS POSITION

(75) Inventors: Junji Baba, Shizuoka (JP); Atsushi Sugimoto, Shizuoka (JP); Naoki Takii, Shizuoka (JP); Masahiro Kusagaya, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 90 days.

This patent is subject to a terminal disclaimer.

(21) Appl. No.: 10/654,693

(22) Filed: Sep. 4, 2003

(65) Prior Publication Data

US 2004/0057240 A1    Mar. 25, 2004

(30) Foreign Application Priority Data

Sep. 20, 2002   (JP) .......................... P.2002-274621

(51) Int. Cl.
*B60Q 1/06* (2006.01)
*B60Q 1/08* (2006.01)
*B60Q 1/10* (2006.01)
*F21V 1/00* (2006.01)

(52) U.S. Cl. ...................... 362/467; 362/466; 362/526; 362/37

(58) Field of Classification Search ................ 362/37, 362/40, 464–465, 523–526
See application file for complete search history.

(56) References Cited

U.S. PATENT DOCUMENTS

| | | | |
|---|---|---|---|
| 4,827,388 A | * | 5/1989 | Miyazawa .................. 362/526 |
| 4,858,080 A | * | 8/1989 | Oikawa ....................... 362/466 |
| 4,860,601 A | * | 8/1989 | Shibata et al. ............. 73/865.8 |
| 4,891,559 A | * | 1/1990 | Matsumoto et al. .......... 315/82 |
| 5,588,733 A | * | 12/1996 | Gotou .......................... 362/37 |
| 5,877,680 A | * | 3/1999 | Okuchi et al. ............. 340/468 |
| 5,907,196 A | * | 5/1999 | Hayami et al. ............. 307/10.8 |
| 6,109,759 A | * | 8/2000 | Tanabe et al. ................ 362/42 |
| 6,183,118 B1 | * | 2/2001 | Toda et al. ................. 362/465 |

(Continued)

FOREIGN PATENT DOCUMENTS

GB       2375386 A       11/2002

(Continued)

*Primary Examiner*—Stephen Husar
*Assistant Examiner*—Jason Han
(74) *Attorney, Agent, or Firm*—Fish & Richardson P.C.

(57) ABSTRACT

Provided is a reference angle position setting means for setting an optical axis at a reference angle position (direction of going straight ahead: 0°) by detecting the maximum deflection angles when swivel lamps 3R and 3L are pivoted in one direction and in the opposite direction and gaining the reference angle position based on both the maximum deflection angles detected. Projector lamps are pivoted in one direction toward the reference angle position so as to set an optical axis position through the steps of detecting a first maximum deflection angle by pivoting each projector 30 lamp in one direction until it is no longer able to pivot in one direction, detecting a second maximum deflection angle by pivoting a headlamp in the opposite direction until it is no longer able to pivot in the opposite direction and computing the reference angle position of the irradiation optical axis from the first and second maximum deflection angles. Thus it is possible to not only set off the deflection produced in the projector lamps and the like but also accurately set the optical axis at the reference angle position at the time of bringing the projector lamps into contact with stoppers on both sides.

8 Claims, 13 Drawing Sheets

U.S. PATENT DOCUMENTS

| | | | |
|---|---|---|---|
| 6,626,563 B2 * | 9/2003 | Nishimura et al. | 362/465 |
| 6,709,135 B2 * | 3/2004 | Couillaud et al. | 362/465 |
| 2002/0163814 A1 | 11/2002 | Hayami et al. | |
| 2002/0163815 A1 | 11/2002 | Hayami | |
| 2004/0057243 A1 * | 3/2004 | Takii et al. | 362/512 |

FOREIGN PATENT DOCUMENTS

| | | |
|---|---|---|
| JP | 2002-160581 | 6/2002 |
| JP | 2002-326535 | 11/2002 |
| JP | 2002-326536 | 11/2002 |

* cited by examiner

VEHICLE HEADLAMP APPARATUS AND METHOD OF SETTING OPTICAL AXIS POSITION

BACKGROUND OF THE INVENTION

The present invention relates generally to a vehicle headlamp apparatus such as automobiles and more particularly to a vehicle headlamp apparatus having a light distribution control means or an AFS (Adaptive Front-Lighting System), for example, for making possible a follow-up change in the irradiating direction and irradiating range of a headlamp in response to the driving condition, wherein the optical axis of a headlamp is accurately set at a reference angle position, and to a method of setting the position of the optical axis of the vehicle headlamp apparatus.

The present applicant for patent has proposed the art of promoting car driving safety in the form of an AFS as mentioned in JP-A-2002-160581. As shown in the conceptual illustration of FIG. 1, the AFS employs a sensor 1 for detecting information indicating the driving conditions of a CAR in order to feed the detected output into an ECU (Electronic Control Unit) 2. The sensor 1 includes, for example, a steering sensor 1A for detecting the steering angle of the steering wheel SW of the CAR, a speed sensor 1B for detecting the speed of the CAR and a height sensor 1C for detecting the height of front and rear axles (only the rear axle is shown) in order to detect the leveling condition of the CAR, these sensors 1A, 1B and 1C being connected to the ECU 2. The ECU 2 operates to control a headlamp 3 whose light distribution characteristics are made variable by deflecting the directions of irradiation of swivel lamps 3R and 3L installed on the right and left sides of the front portion of the automobile on the basis of the output of the sensor 1 received. In such swivel lamps 3R and 3L, reflectors and projector lamps provided in the headlamp are allowed to swivel in the horizontal direction, for example, and a rotating drive means driven to rotate by a source of driving force such as a drive motor is installed. A mechanism including the rotating drive means is called an actuator hereinafter. With the AFS of this kind, it is possible to light the road ahead in proportion to the driving speed of the automobile when the automobile is driven on the curved road, which is effective in promoting driving safety.

In order to implement proper lighting, the steering angle of the steering wheel and the deflection angle of each swivel lamp should be set accurately; otherwise the optical axis of the swivel lamp may be turned to an undesirable direction with respect to the travel direction of the automobile, for example, the swivel lamp fails to light forward when the automobile is moving straight ahead or running on the curved road. Moreover, the swivel lamp may be deflected toward the oncoming lane and may blind oncoming traffic; the problem is that the driving safety is endangered.

Therefore, swivel lamp is initialized so as to direct the swivel lamp to a predetermined reference angle position, usually turning the swivel lamp to the direction in which the automobile is moving straight ahead in the conventional AFS when the ignition switch of the automobile is turned on. Thus the steering wheel SW can be matched off against the deflection angle of the swivel lamp and the proper deflecting operation becomes performable hereafter with the initialized reference angle position as a reference. However, the present deflected angle of the swivel lamp needs detecting for the initialization of the swivel lamp and in a conventional actuator of this sort, there is provided a deflection angle detector for detecting the deflected angle of the torque output shaft of the actuator correspondingly related to the deflected angle of the swivel lamp. For example, a potentiometer is attached to the output shaft of the rotating drive means for driving the swivel lamp to rotate so as to detect the angle of rotation, namely, the deflected angle, of the output shaft from the output of the potentiometer.

Notwithstanding, the setting of the potentiometer is undesirable mainly because the actuator tends to become complicated in structure and size. Hence, it has been considered to detect the deflected angle of the swivel lamp by detecting the angle of rotation of the drive motor as the drive source of the rotating drive means of the actuator and consequently Hall elements and Hall ICs (hereinafter called the Hall element) for outputting pulse signals corresponding to the number of revolutions of the drive motor as the rotating drive means. In other words, the deflected angle of the actuator is indirectly detected by counting the pulse signals issued from the Hall elements accompanied with the rotational operation of the drive motor, so that the proper control of the AFS is implemented.

Initialization to be carried out under a one-side contact system has been examined as a means for initializing swivel lamps by utilizing pulse signals from the Hall elements. The initialization by the one-side contact system is as shown in the conceptual illustration of FIG. 12B carried out by unidirectionally pivoting the swivel lamp, that is, a projector lamp 30 until the projector lamp is brought into contact with a stopper from a first position S, that is, up to the right-side maximum deflection angle position $\theta r$ in this case. The projector lamp 30 is pivoted from the contact position $\theta r$ in the opposite direction and simultaneously the counting of the pulse signals from the Hall element is started and is then stopped at a point of time the preset pulse signals are counted. Consequently, on condition that the counted number of pulse signals in relation with the deflected angle of the projector lamp 30 is gained beforehand, the projector lamp 30 can be pivoted from the contact position $\theta r$ by a predetermined deflection angle $\theta z$, depending on the counted number of pulse signals, whereby the predetermined reference angle position of the projector lamp 30 can be set in the direction of going straight ahead in this case.

In carrying out the initialization under the one-side contact system, the position $\theta r$ where the projector lamp 30 is brought into contact with the stopper in one direction is equivalent to a setting start angle position at the time of setting and pulse signals are counted from the setting start angle position by the deflection angle $\theta z$ so as to set the reference angle position in the direction of going straight ahead. Consequently, a deflection $\theta x$ is produced and when the setting start angle position falls on the position $\theta r'$, the deflection $\theta x$ directly causes an error of the reference angle position to be produced. In other words, when the projector lamp 30 is brought into contact with the stopper in one direction, the deflection due to stress occurs in the projector lamp and the actuator and this results in turning the drive motor excessively by the angle $\theta x$ because of the deflection, so that an error is produced in the setting start angle position. When the elastic modulus and thermal expansion coefficient of material such as resin and metal used for the projector lamp and the actuator are taken into consideration, the values of the elastic modulus and thermal expansion coefficient vary with the temperature and the deflection $\theta x$ also varies with the temperature change, which causes an error in the setting start angle position as well. Therefore, an error is produced in the reference angle position when the projector lamp 30 is put back in the opposite direction by the predetermined deflection angle θz and this develops a problem arising from failing to secure the proper control of the AFS hereafter.

SUMMARY OF THE INVENTION

An object of the invention is to provide a vehicle headlamp apparatus so arranged as to eliminate initialization errors in an AFS and to secure the proper control of the AFS.

A vehicle headlamp apparatus according to the invention, includes light distribution control means for deflecting the irradiation optical axis of a headlamp to the right and left in response to the steering angle of a vehicle, and reference angle position setting means is provided for detecting the maximum deflection angle when the headlamp is pivoted in one direction as well as the maximum deflection angle when the headlamp is pivoted in the opposite direction and gaining a reference angle position based on both the maximum deflection angles thus detected whereby to set the reference angle position to the irradiation optical axis. For example, the light distribution control means is so arranged as to pivot the headlamp with a drive motor, and the reference angle position setting means has detection means for detecting an angle of rotation of the drive motor and detection means for detecting the pivoting position of the headlamp from the angle of rotation thus detected and is used for gaining the maximum deflection angle from the detected pivoting position of the headlamp and setting the maximum deflection angle at the reference angle position.

A method of setting the position of the optical axis of a vehicle headlamp apparatus according to the invention, having light distribution control means for deflecting the irradiation optical axis of a headlamp to the right and left in response to the steering angle of a vehicle, comprises the steps of detecting a first maximum deflection angle by pivoting the headlamp in one direction until the headlamp is no longer able to pivot in one direction, detecting a second maximum deflection angle by pivoting the headlamp in the opposite direction until the headlamp is no long able to pivot in the opposite direction and computing the reference angle position of the irradiation optical axis from the first and second maximum deflection angles and pivoting the headlamp in one direction toward the reference angle position.

According to the invention, the adoption of a so-called both-side contact system wherein the maximum deflection angles are detected by pivoting the headlamp in both one direction and the opposite direction; the reference angle position is computed from the maximum deflection angle; and then the optical axis is set at the reference angle position thus computed makes it possible to not only set off the deflection produced in the headlamp and the actuator but also accurately set the optical axis of the headlamp at the reference angle position. Thus the proper control of the AFS accompanied with the driving of the automobile can be secured hereafter.

BRIEF DESCRIPTION OF THE DRAWINGS

FIG. 10 is a flowchart for executing the initialization of a projector lamp when an ignition switch is turned on.

DETAILED DESCRIPTION OF THE PREFERRED EMBODIMENTS

Figure 1:
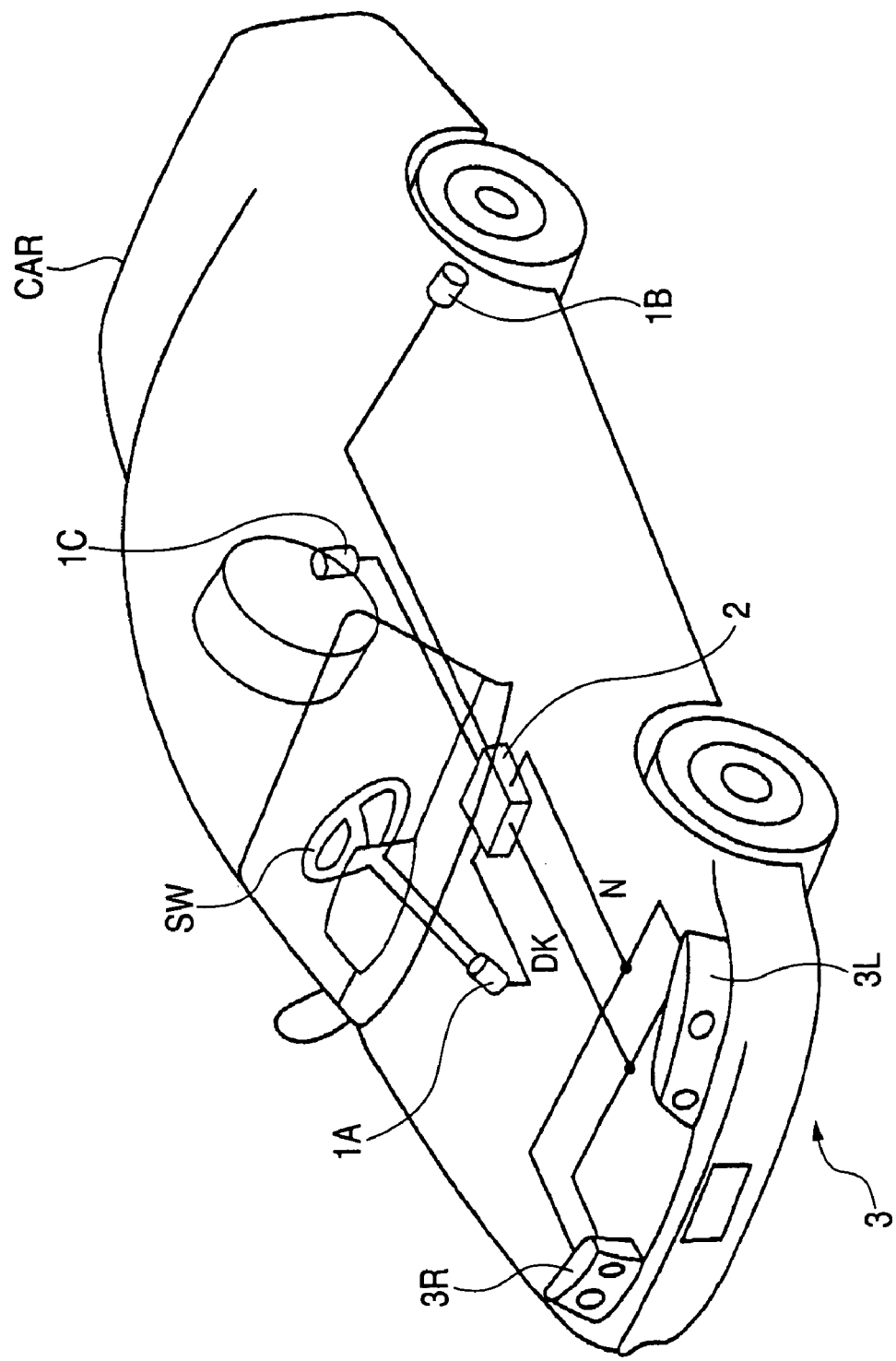
FIG. 1 is a conceptual illustration of AFS.
Figure 2:
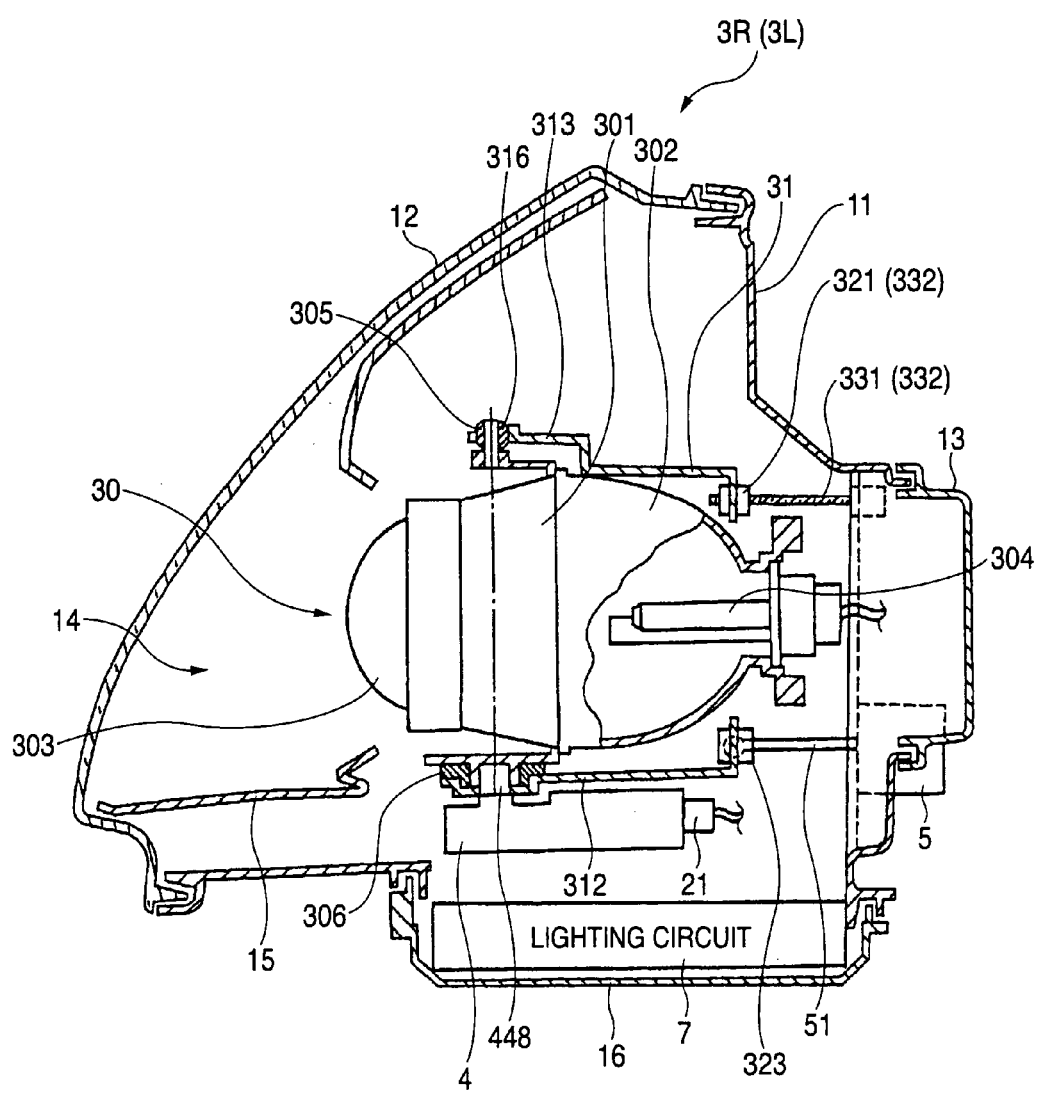
FIG. 2 is a vertical sectional view of a swivel lamp.
Figure 3:
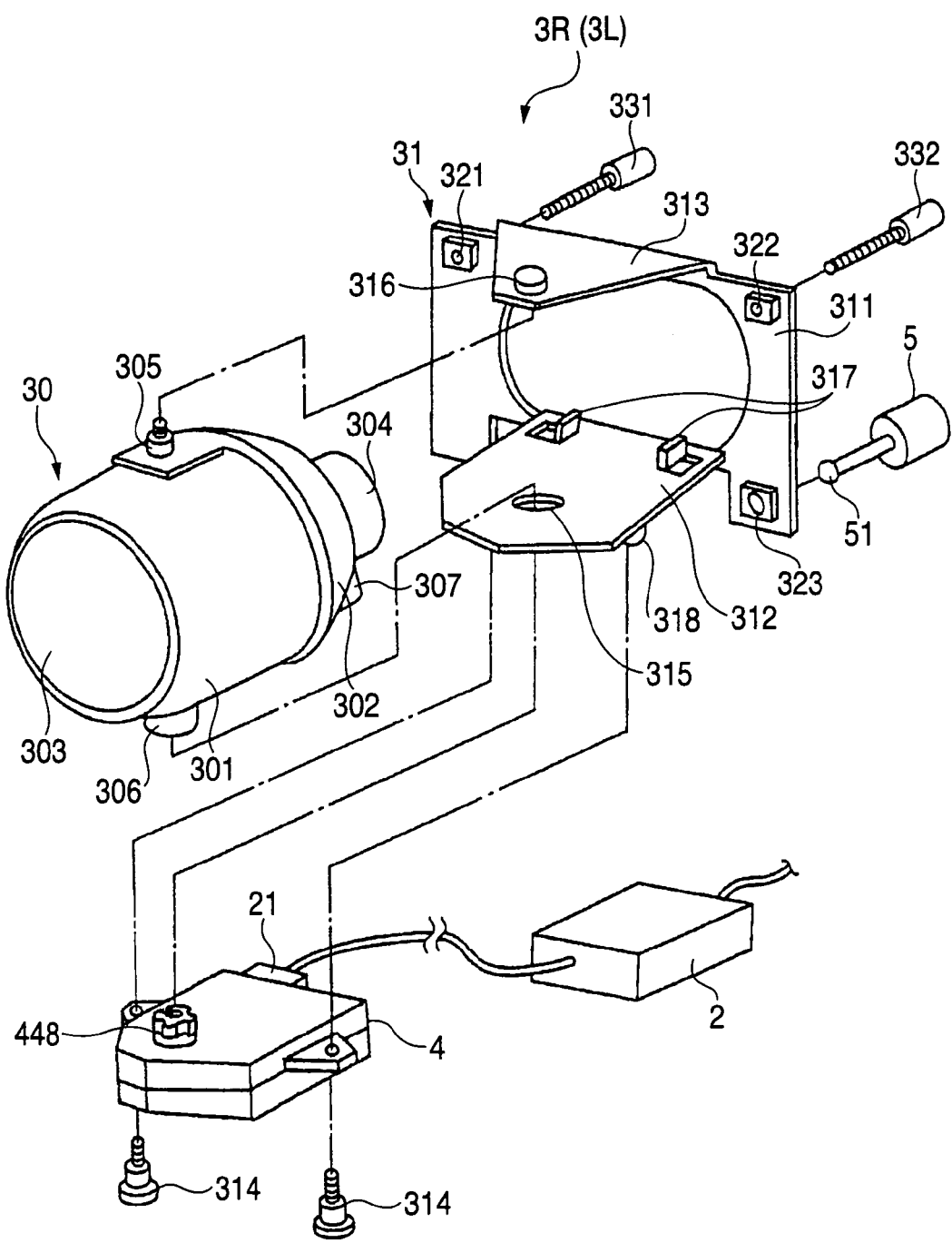
FIG. 3 is an exploded perspective view of the principal part of the internal structure of the swivel lamp.

An embodiment of the invention will now be described by reference to the invention. FIG. 2 is a vertical sectional view of the internal structure of a headlamp formed with a swivel lamp capable of deflecting the direction of irradiation to the right and left out of the component elements of an AFS as a deflection angle control means of the lamp according to the invention as shown in FIG. 1; and FIG. 3, a partial exploded perspective view of the principal part of the internal structure of the swivel lamp. A lens 12 is attached to the front opening of a lamp body 11 and a rear cover 13 is attached to the rear opening thereof in order to form a lamp chamber 14. A projector lamp 30 is disposed within the lamp chamber 14. The projector lamp 30 has a sleeve 301, a reflector 302, a lens 303 and a light source 304 as integral parts; however, a detailed description of these parts will be omitted as the projector lamp 30 is widely used now. In this case, a discharge bulb is employed as this light source 304. The projector lamp 30 is supported by a substantially U-shaped bracket 31. An extension 15 is arranged around the projector lamp 30 within the lamp body 11 so that the interior is not exposed outside through the lens 12. Further, there is installed a lighting circuit 7 inside for use in lighting the discharge bulb of the projector lamp 30 by making use of a lower cover 16 attached to the base opening of the lamp body 11 according to this embodiment of the invention.

The projector lamp 30 is supported in such a condition that it is held between a lower and an upper plate 312 and 313 that are bent at substantially right angles to the vertical plate 311 of the bracket 31. An actuator 4, which will be described later, is fixed with screws 314 under the lower plate 312 and the torque output shaft 448 of the actuator 4 is projected upward through a shaft hole 315 bored in the lower plate 312. The screws 314 are screwed into bosses 318 projected from the underside of the lower plate 312. A shaft portion 305 formed on the top surface of the projector lamp 30 is fitted into a bearing 316 provided in the upper plate 313, whereas a coupling portion 306 provided on the undersurface of the projector lamp 30 is mated with and coupled to the torque output shaft 448 of the actuator 4, whereby the projector lamp 30 is made laterally pivotable with respect to the bracket 31 and together with the torque output shaft 448, also made horizontally pivotable when the actuator 4 is operated.

Aiming nuts 321 and 322 are integrally attached to the respective upper right and left portions of the bracket 31 as seen head-on and a leveling bearing 323 is also integrally attached to the lower right portion thereof. A horizontal aiming screw 331 and a vertical aiming screw 332 supported by the lamp body 11 in such a condition as to be rotatable on the axis of rotation are screwed into the respective aiming nuts 321 and 322. The leveling ball 51 of a leveling mechanism 5 supported by the lamp body 11 is fitted into the leveling bearing 323. With this arrangement, by making the horizontal aiming screw 331 operate to rotate on the axis of rotation, the bracket 31 is allowed to horizontally pivot with a line connecting the right aiming nut 322 and the leveling bearing 323 as a fulcrum. Moreover, by making the horizontal aiming screw 331 and the vertical aiming screw 332 operate to simultaneously rotate on the axis of rotation, the bracket 31 is allowed to vertically pivot upward and downward with the leveling bearing 323 as a fulcrum. The leveling ball 51 is axially moved back and forth by operating the leveling mechanism 5 and the bracket 31 is allowed to vertically pivot with a line connecting the right and left aiming nuts 321 and 322 as a fulcrum. It is thus possible to make an aiming adjustment for adjusting the optical axis of the projector lamp 30 in the lateral and vertical directions and to make an aiming adjustment for adjusting the optical axis of the projector lamp 30 according to the leveling condition resulting from a change in the height of an automobile. In this case, a protrusion 307 is projected from the undersurface of the reflector 302 of the projector lamp 30 and a pair of stoppers 317 cut-raised on the right and left sides of the lower plate 312 of the bracket 31 are formed opposite to the bracket 31. When the protrusion 307 contacts one of the stoppers 317 with a shock force as the projector lamp 30 pivots, the pivoting range of the projector lamp 30 is regulated.

Figure 4:
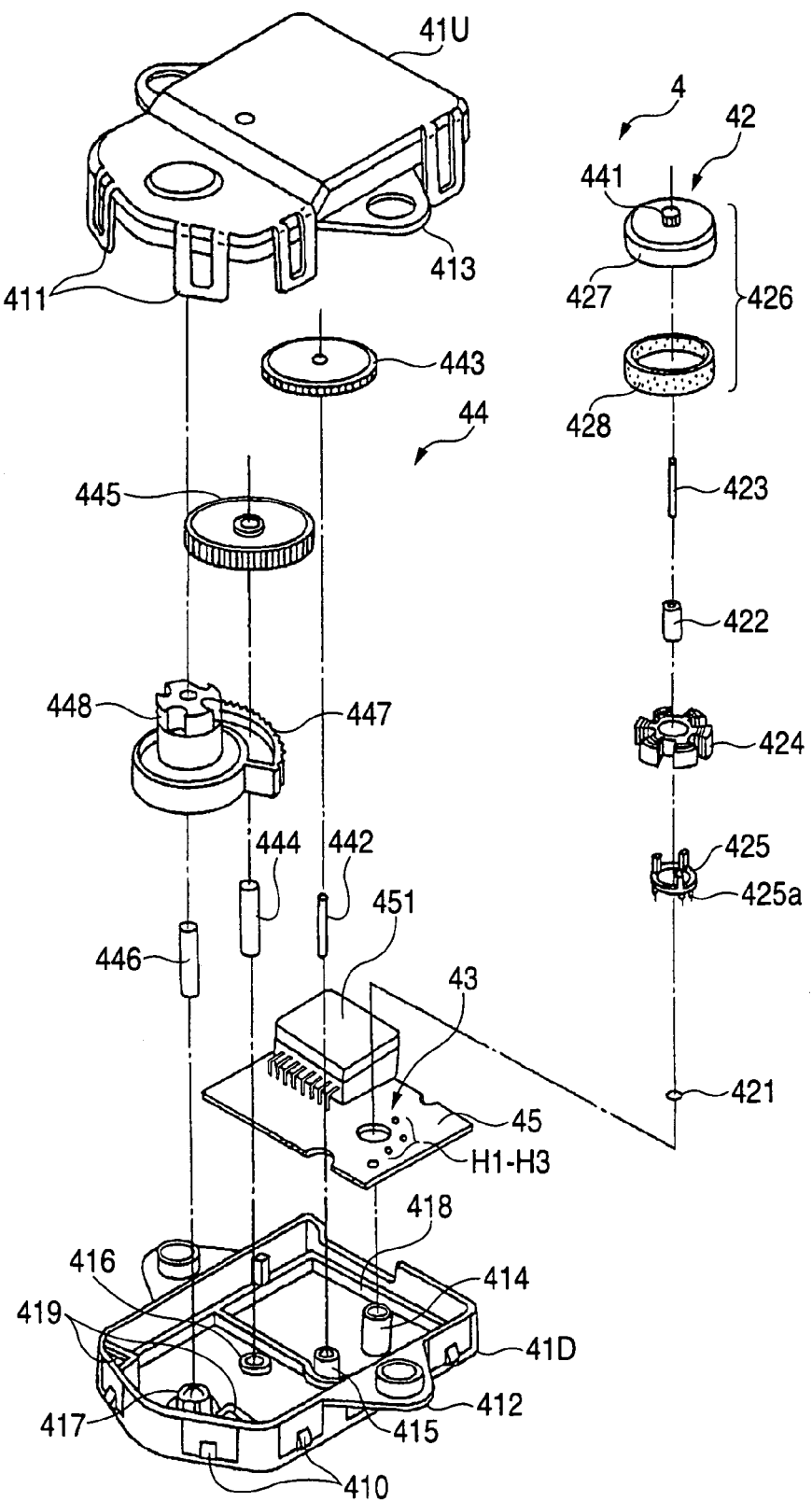
FIG. 4 is a partial exploded perspective view of an actuator.
Figure 5:
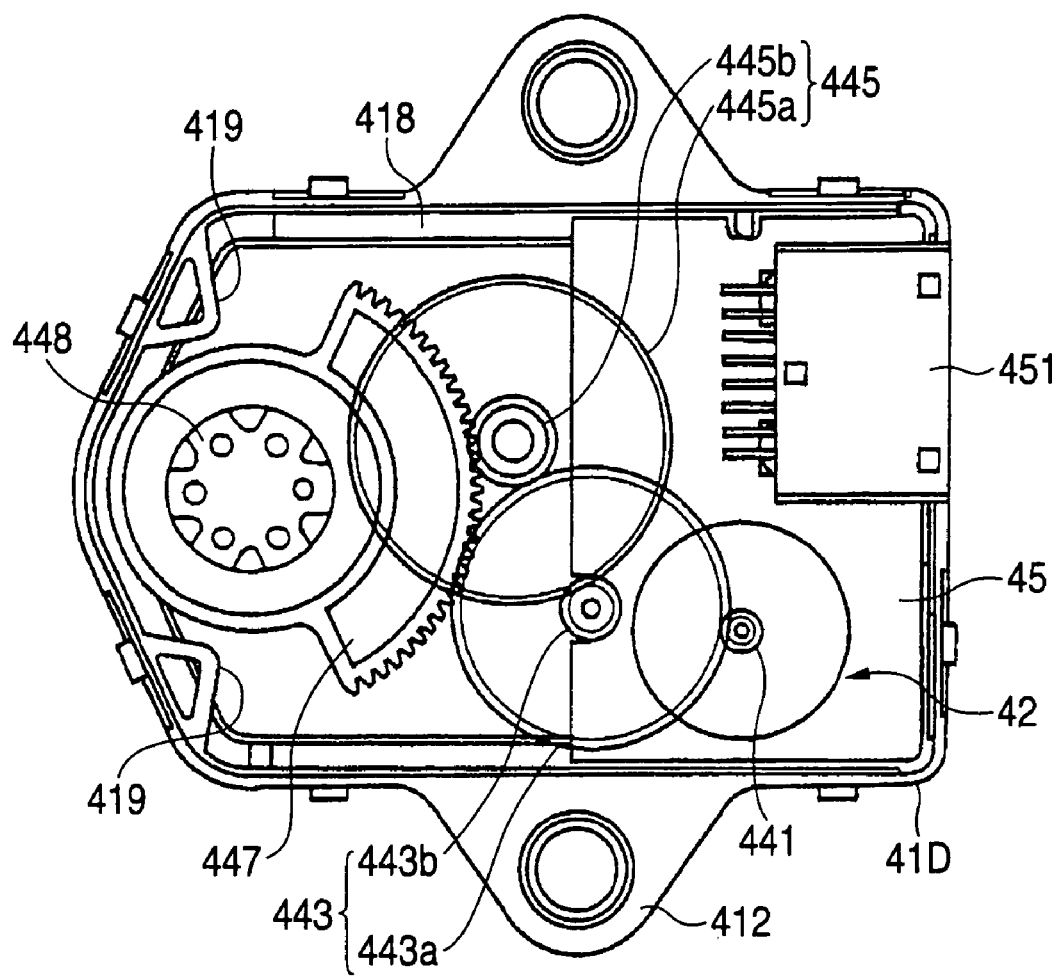
FIG. 5 is a plan view of the actuator.

FIG. 4 is an exploded perspective view of the principal part of the actuator 4 for making swivel lamps 3R and 3L perform swivel operation; FIG. 5, a plan view thereof in an assembled condition; and FIG. 6, a vertical sectional view thereof. A case 41 is formed with a lower and an upper half 41D and 41U in the form of a substantially pentagonal dish-like plate. A plurality of protrusions 410 projected from the peripheral face of the lower half 41D are fitted into a plurality of mating parts 411 hung downward from the peripheral face of the upper half 41U in order to form a case chamber inside. A support part 412 is projected outward from each side of the lower half 41D and a support part 413 is projected outward from each side of the upper half 41U, so that these support parts 412 and 413 are utilized for fixing the case 41 to the bosses 318 of the bracket 31 with screws 314. The torque output shaft 448 in a splined condition is projected from the top surface of the case 41 and connected to the coupling portion 306 of the base of the projector lamp 30 and a connector 451 is disposed on the back surface of the case 41, so that an external connector 21 (see FIG. 2) connected to an ECU 2 is fitted in the connector 451.

Four hollow bosses 414, 415, 416 and 417 are uprightly provided in position on the inner base of the lower half 41D of the case 41 and a brushless motor 42 as a drive motor, which will be described later, is assembled at the first hollow boss 414. Shafts of a gear mechanism 44 are respectively inserted into and supported by second to fourth hollow bosses 415, 416 and 417. A stepped rib 418 is formed integrally with the peripheral edge of the inner base of the lower half 41D and a printed-circuit board 45 is mounted on the stepped rib 418 in such a condition that its peripheral edge portion is in contact with the stepped rib 418 and internally supported within the case 41 so that the printed-circuit board 45 is held between a rib directed downward (not shown) and provided in the upper half 41U and the stepped rib 418. The first hollow boss 414 is passed through the printed-circuit board 45 and the brushless motor 42 thus assembled is electrically connected onto the printed-circuit board 45 on which various electronic parts (not shown) forming a control circuit 43, which will be described later, and the connector 451 are mounted.

Figure 7:
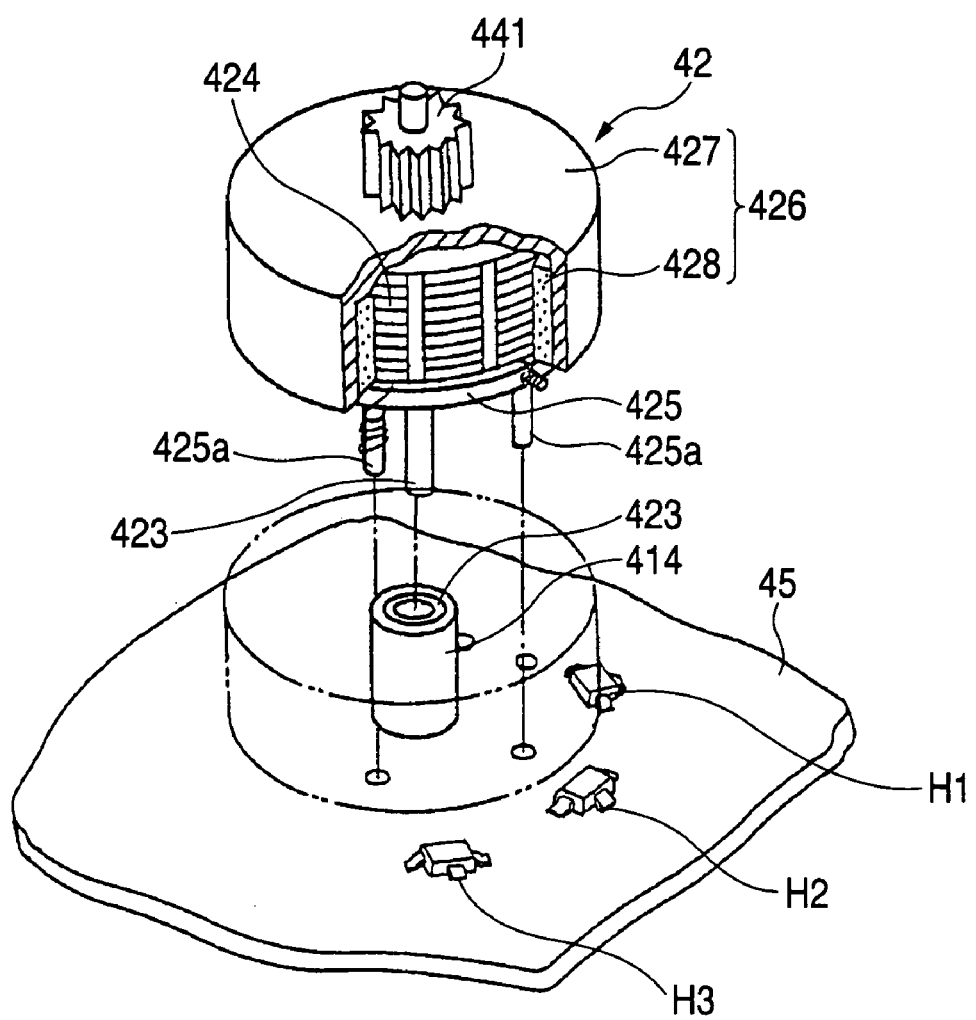
FIG. 7 is a partial enlarged perspective view of a brushless motor.

The rotating shaft 423 of the brushless motor 42 is as shown in a partially cutaway perspective view of FIG. 7 supported on the first hollow boss 414 of the lower half 41D in such a condition as to be rotatable on the axis of rotation by a thrust bearing 421 and a sleeve bearing 422. A stator coil 424 including three pairs of coils equally distributed in the circumferential direction is fixedly supported in the first hollow boss 414 and electrically connected to the printed-circuit board 45 and supplied with electric power thereby. In this case, the stator coil 424 is assembled together with a core base 425 and arranged so that it is electrically connected to the printed-circuit board 45 by making use of terminals 425a provided to the core base 425. A rotor 426 in the form of a cylindrical receptacle is fixedly attached to the upper end portion of the rotating shaft 423 in such a manner as to cover the stator coil 424. The rotor 426 is formed with a yoke 427 in the form of a resin-molded cylindrical receptacle and an annular rotor magnet 428 attached to the inner peripheral face of the yoke 427 whose domains alternate between S and N magnetic poles in the circumferential direction.

In the brushless motor 42, the magnetic directions of the three coils are varied by supplying alternating currents different in phase to the respective three coils of the stator coil 424, whereby the rotor 426 and the rotating shaft 423 are driven to rotate. As shown in FIG. 7, a plurality of Hall elements, namely, three Hall elements H1, H2 and H3 in this case are arranged at desired intervals and supported by the printed-circuit board 45 along the circumferential direction of the rotor 426. When the rotor magnet 428 together with the rotor 426 is rotated, the magnetic fields at the Hall elements H1, H2 and H3 are varies and so are the on-off conditions of the Hall elements H1, H2 and H3, so that pulse signals are output in response to the rotating period of the rotor 426.

Figure 6:
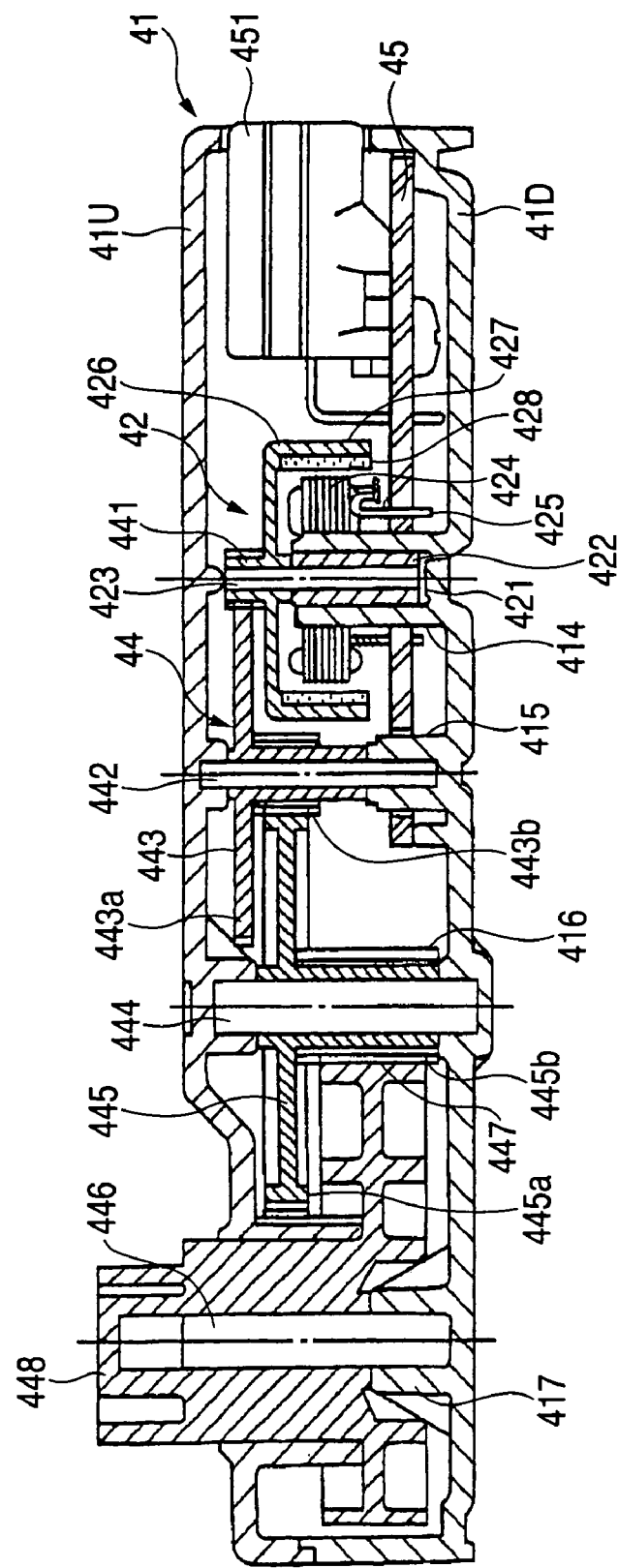
FIG. 6 is a vertical sectional view of the actuator.

The yoke 427 of the rotor 426 and a first gear wheel 441 are integrally resin-molded and the first gear wheel 441 is formed as part of the gear mechanism 44 so as to drive the torque output shaft 448 to rotate at a reduced speed. More specifically, the gear mechanism 44 includes, in addition to the first gear wheel 441, a second gear wheel 443 rotatably supported by a first fixed shaft 442 supported by the second hollow boss 415, a third gear wheel 445 rotatably supported by a second fixed shaft 444 supported by the third hollow boss 416 and a sector gear wheel 447 rotatably supported by a third fixed shaft 446 supported by the fourth hollow boss 417 and formed integrally with the torque output shaft 448, these gear wheels being resin-molded. As shown in FIGS. 5 and 6, the second large-diameter gear wheel 443a and the second small-diameter gear wheel 443b of the second gear wheel 443 are axially integrated with each other and the second large-diameter gear wheel 443a is engaged with the first gear wheel 441. The third large-diameter gear wheel 445a and the third small-diameter gear wheel 445b of the third gear wheel 445 are axially integrated with each other and the third large-diameter gear wheel 445a is engaged with the second small-diameter gear wheel 443b. Further, the third small-diameter gear wheel 445b is engaged with the sector gear wheel 447. Thus, the torque of the first gear wheel 441 rotated together with the rotor 427 of the brushless motor 42 is reduced via the second gear wheel 443, the third gear wheel 445 and the sector gear wheel 447 and transmitted to the torque output shaft 448. Stoppers 419 to be contacted with a shock force by the respective end portions of the sector gear wheel 447 are protruded from the inner surface of the lower half 41D and by these stoppers 419, the rotating range of the torque output shaft 448 is regulated. The rotating range of the sector gear wheel 447 is designed so as to be slightly greater than the rotating range of the projector lamp 30 regulated by the protrusion 307 and the stoppers 317, whereby the projector lamp 30 is prevented by the protrusion 307 from being pivoted without any restriction when the function of the stoppers 317 runs into any trouble.

Figure 8:
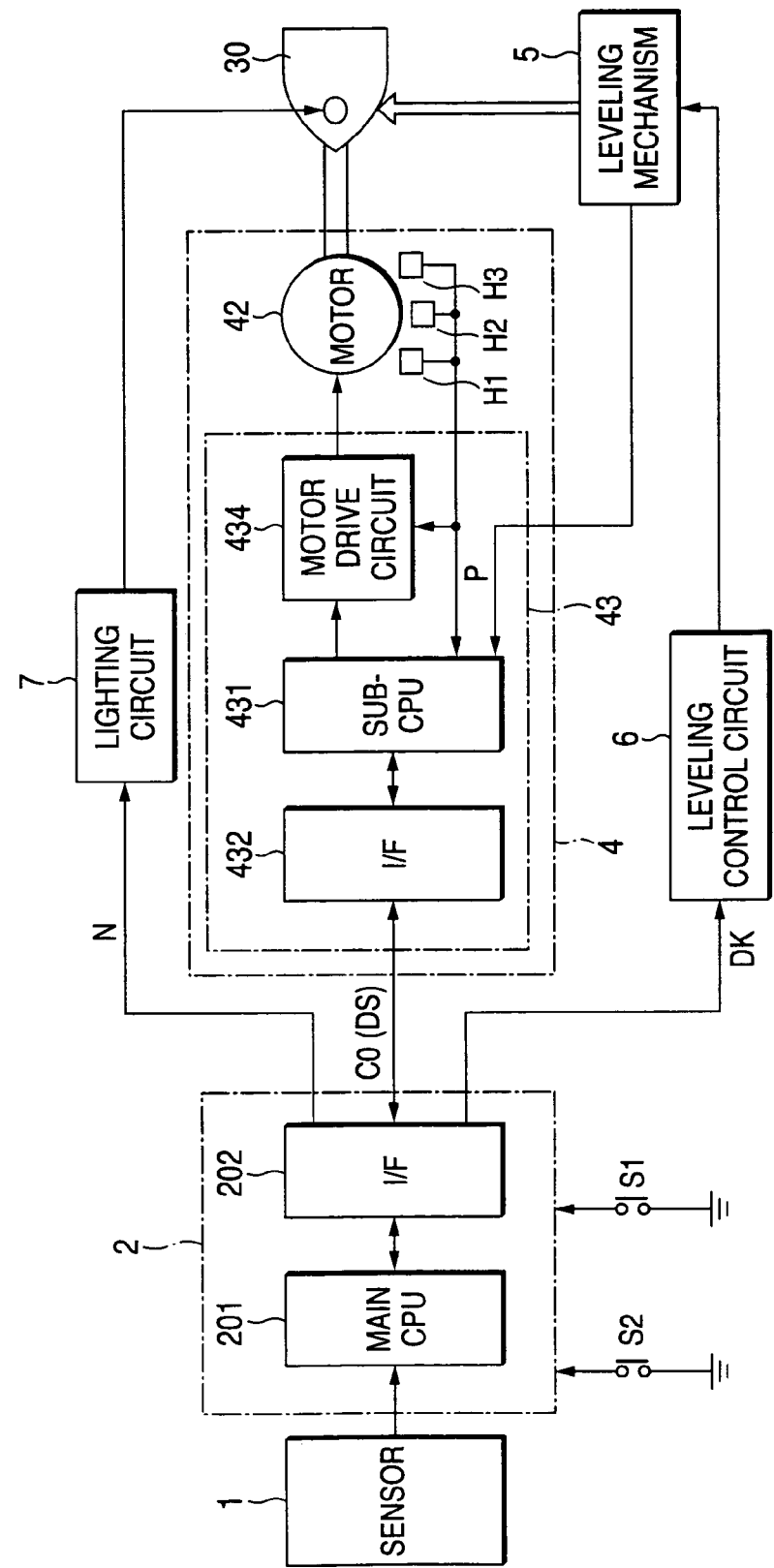
FIG. 8 is a block circuit diagram showing an AFS circuit arrangement.

FIG. 8 is a block circuit diagram showing an electric circuit arrangement in a lighting apparatus including the ECU 2 and the actuator 4. The actuator 4 is installed in both the right- and left-side swivel lamps 3R and 3L of the automobile, which makes possible bidirectional communication between the ECU 2 and these swivel lamps 3R and 3L. In the ECU 2, there are provided a main CPU 201 for performing a predetermined algorithmic process according to the information from a sensor 1 and an interface (hereinafter called I/F) circuit 202 for use in exchanging control signals CO between the main CPU 201 and the actuator 4. Moreover, the on-off signal of a lighting switch S1 provided in the automobile can be fed into the ECU 2 and a control signal U based on the on-off condition of the lighting switch S1 is used for controlling the lighting circuit 7 connected to an on-board power supply (not shown) and used to supply electric power to the discharge bulb 304 of the projector lamp 30 so as to make switchable the conditions of turning on and off the swivel lamps 3R and 3L. The ECU 2 also controls a leveling control circuit 6 for controlling the leveling mechanism 5 for vertically adjusting the optical axis of the bracket 31 used to support the projector lamp 30 by means of a leveling signal DK so as to adjust the optical axis of the projector lamp 30 as the height of the automobile varies. In this case, the connected-to-power-supply conditions of these electric circuits are needless to say made to switch between on and off states by an ignition switch S2 for turning on and off the electric system provided in the automobile.

The control circuit 43 formed on the printed-circuit board 45 internally installed in the actuator 4 provided in each of the right- and left-side swivel lamps 3R and 3L of the automobile has an I/F circuit 432 for use in exchanging signals with the ECU 2, a sub-CPU 431 for performing a predetermined algorithmic process according to a signal fed from the I/F circuit 432 and pulse signals P that are output from the Hall elements H1, H2 and H3 and a motor driving circuit 434 for driving the brushless motor 42 as a rotating drive means to rotate. In this case, the lateral deflection angle signal DS of the swivel lamps 3R and 3L as part of the control signal CO is output from the ECU 2 and input to the actuator 4.

Figure 9:
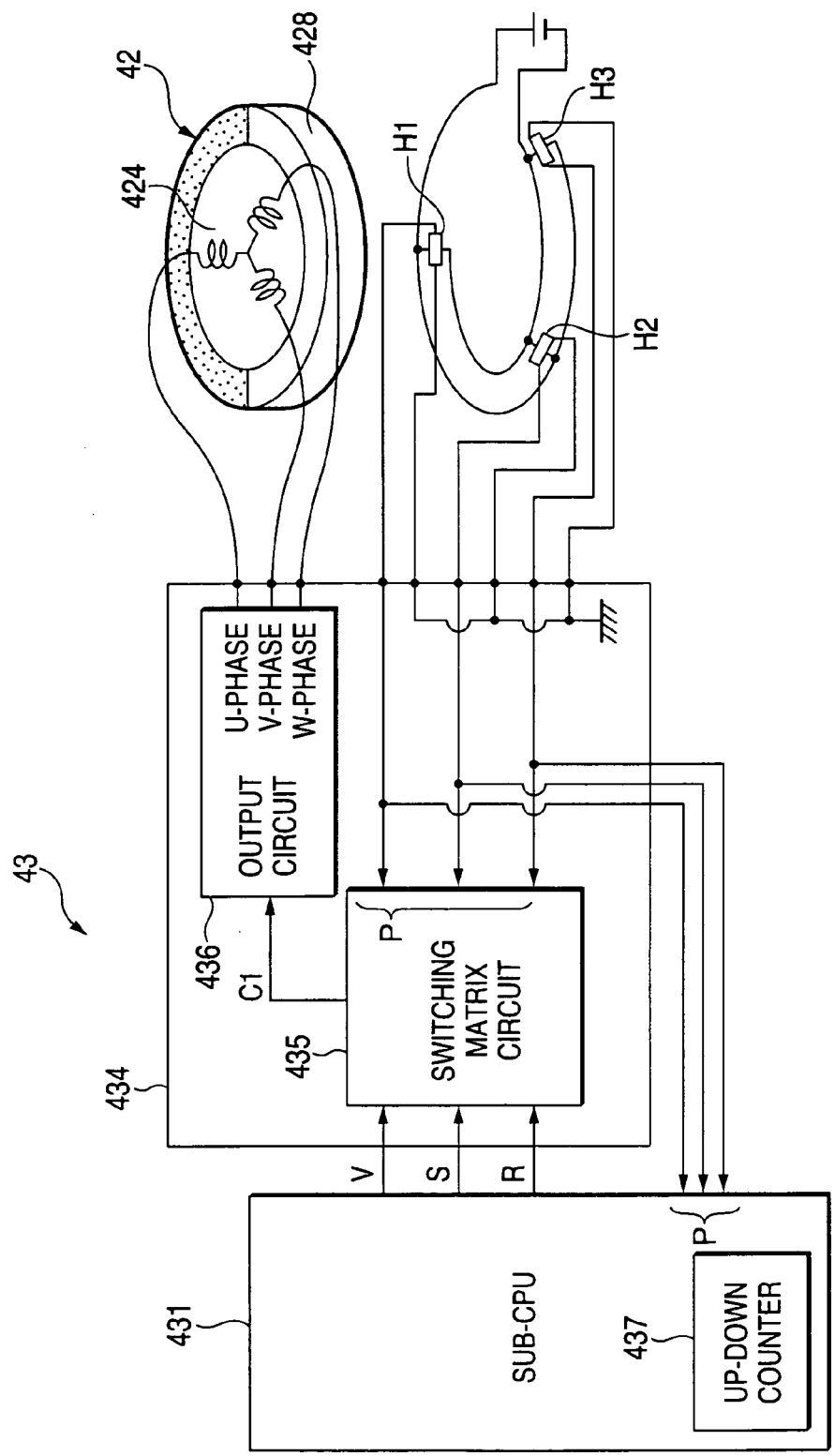
FIG. 9 is a circuit diagram showing an actuator circuit arrangement.

FIG. 9 is an exemplary circuit diagram showing the motor driving circuit 434 of the control circuit 43 and brushless motor 42 within the actuator 4. The motor driving circuit 434 has a switching matrix circuit 435 for receiving a speed control signal V, a start-stop signal S and a forward-backward revolution signal R as control signals from the sub-CPU 431 of the control circuit 43 as well as receiving the pulse signals P from the three Hall elements H1, H2 and H3 and an output circuit 436 for adjusting three-phase electric power (in U-, V- and W-phases) supplied to the three pairs of coils of the stator coil 424 of the brushless motor 42 on receiving the output of the switching matrix circuit 435. The rotor magnet 428 is rotated by supplying the power in U-, V- and W-phases to the stator coil 424 from the motor driving circuit 434, whereupon the yoke 427 integral with rotor magnet 428, that is, the rotor 426 and the rotating shaft 423 are rotated. When the magnet rotor 428 rotates, the Hall elements H1, H2 and H3 detect variations in the magnetic field and output the pulse signals P. The pulse signals P are then fed to the switching matrix circuit 435 and a switching operation is performed in the output circuit 436 in synchronization with the timing of the pulse signals from the switching matrix circuit, whereby the rotation of the rotor 426 is continued.

The switching matrix circuit 435 feeds a desired control signal C1 into the output circuit 436 on the basis of the speed control signal V, the start-stop signal S and the forward- and backward-revolution signal R from the sub-CPU 431 and on receiving the control signal C1, the output circuit 436 adjusts the phase of three-phase electric power to be supplied to the stator coil 424 so as to control when to start or stop the rotating operation, the direction of rotation and the revolution speed of the brushless motor 42. The sub-CPU 431 is fed with part of each of the pulse signals P issued from the Hall elements H1, H2 and H3 whereby to recognize the rotating condition of the brushless motor 42. An up-down counter 437 is contained in the sub-CPU 431 so that by counting the pulse signals from the Hall elements H1, H2 and H3, the counted value is caused to correspond to the rotating position of the brushless motor 42.

With the arrangement above, upon receipt of information about the steering angle of the steering wheel SW, speed and height of the automobile from the sensor 1 as shown in FIG. 1 with the ignition switch S2 and the lighting switch S1 kept in the on-state, the ECU 2 causes the CPU 201 to carry out calculations on the basis of the sensor output thus supplied in order to compute the lateral deflection angle signal DS of projector lamp 30 and feeds the signal DS into the actuator 4 in each of the swivel lamps 3R and 3L. In the actuator 4, the sub-CPU 431 carries out calculations according to the lateral deflection angle signal DS thus supplied and feeds a calculated signal corresponding to the lateral deflection angle signal DS into the motor driving circuit 434 so as to drive the brushless motor 42 to rotate. As the driving torque of the brushless motor 42 is reduced by the gear mechanism 44 before being transmitted to the torque output shaft 448, the projector lamp 30 coupled to the torque output shaft 448 pivots horizontally and the optical axis of each of the swivel lamps 3R and 3L is deflected laterally. When the projector lamp 30 makes the pivotal motion, the deflection angle of the projector lamp 30 is detected from the angle of rotation of the brushless motor 42. In other words, the sub-CPU 431 detects the deflection angle of the projector lamp 30 according to at least one of the pulse signals P (P1, P2 and P3) issued from the three Hall elements H1, H2 and H3 provided for the brushless motor 42 as shown in FIG. 8. Further, the sub-CPU 431 compares the deflection angle signal detected by the sub-CPU 431 with the lateral deflection angle signal DS received from the ECU 2 and by subjecting the angle of rotation of the brushless motor 42 to feedback control so that both signals conform to each other, whereby the directions of the optical axes of the projector lamps 30, that is, the directions of the optical axes of the swivel lamps 3R and 3L can be controlled so accurately that the directions of the optical axes thereof are fixed at the deflected positions set according to the lateral deflection angle signal DS.

When the projector lamp 30 thus makes a deflecting motion, the deflected light emitted from the respective swivel lamps 3R and 3L lights up the area deflected from the direction in which the automobile is going straight ahead to the right or left and even during the travel of the automobile, it is possible to light up not only the direction in which the automobile is going straight ahead but also the forward direction into which the course has been steered; consequently, safety drivability is enhanced.

Figure 10:
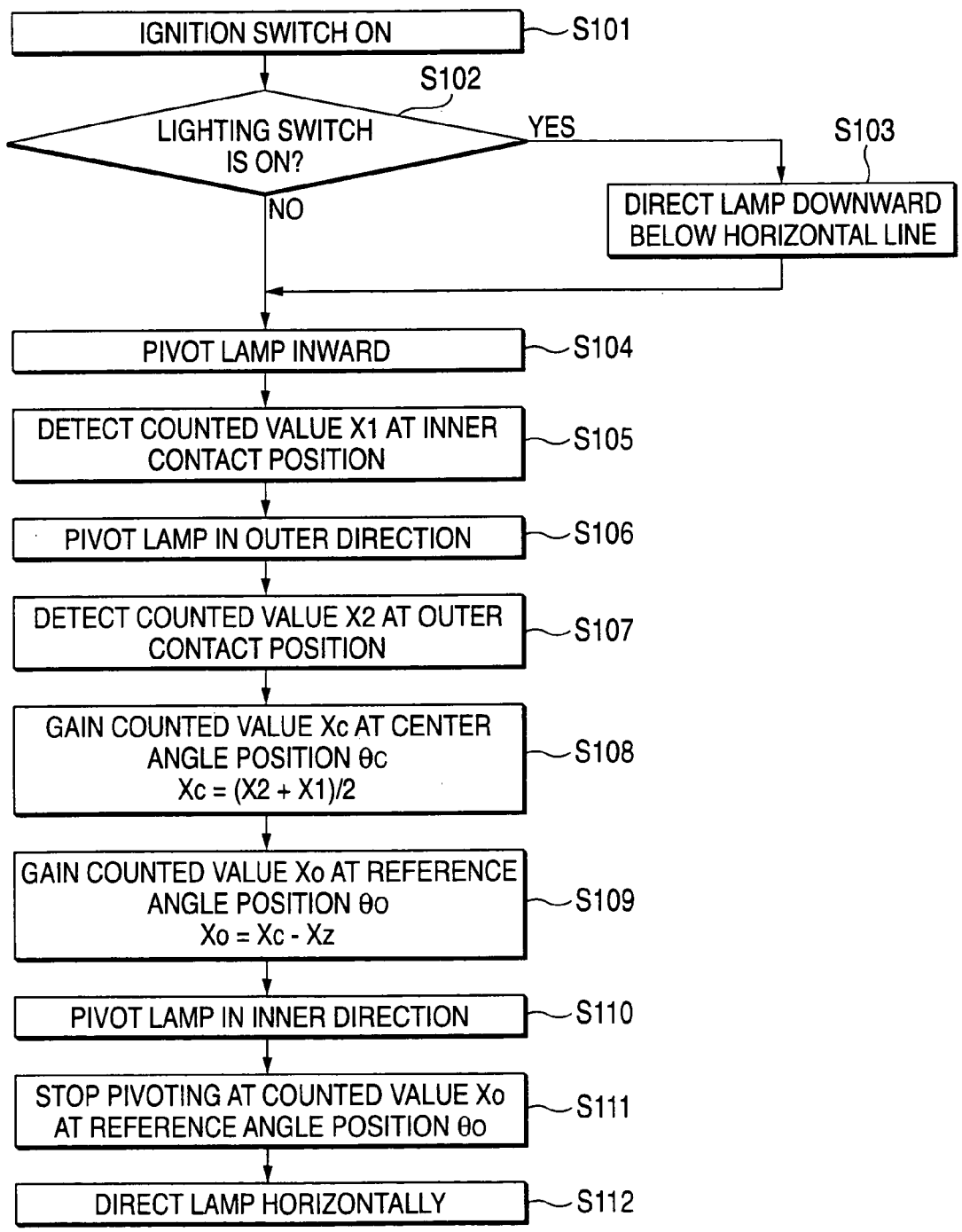
Figure 11A:
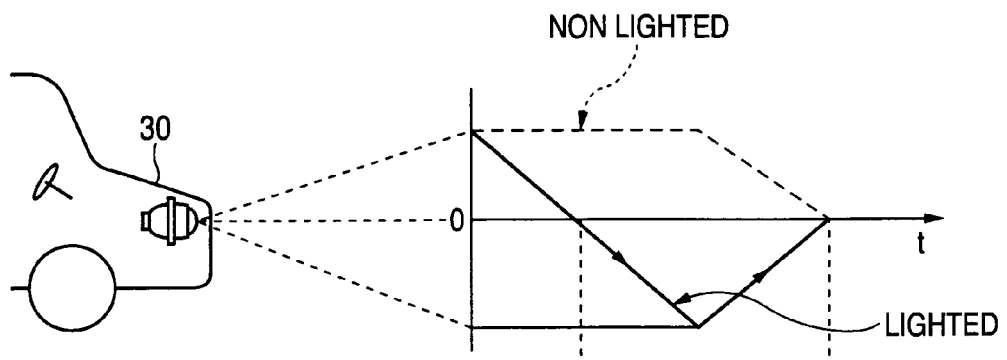
FIGS. 11A and 11B are diagrams showing the pivotal motion of the projector lamp and a chart showing the timing.
Figure 11B:
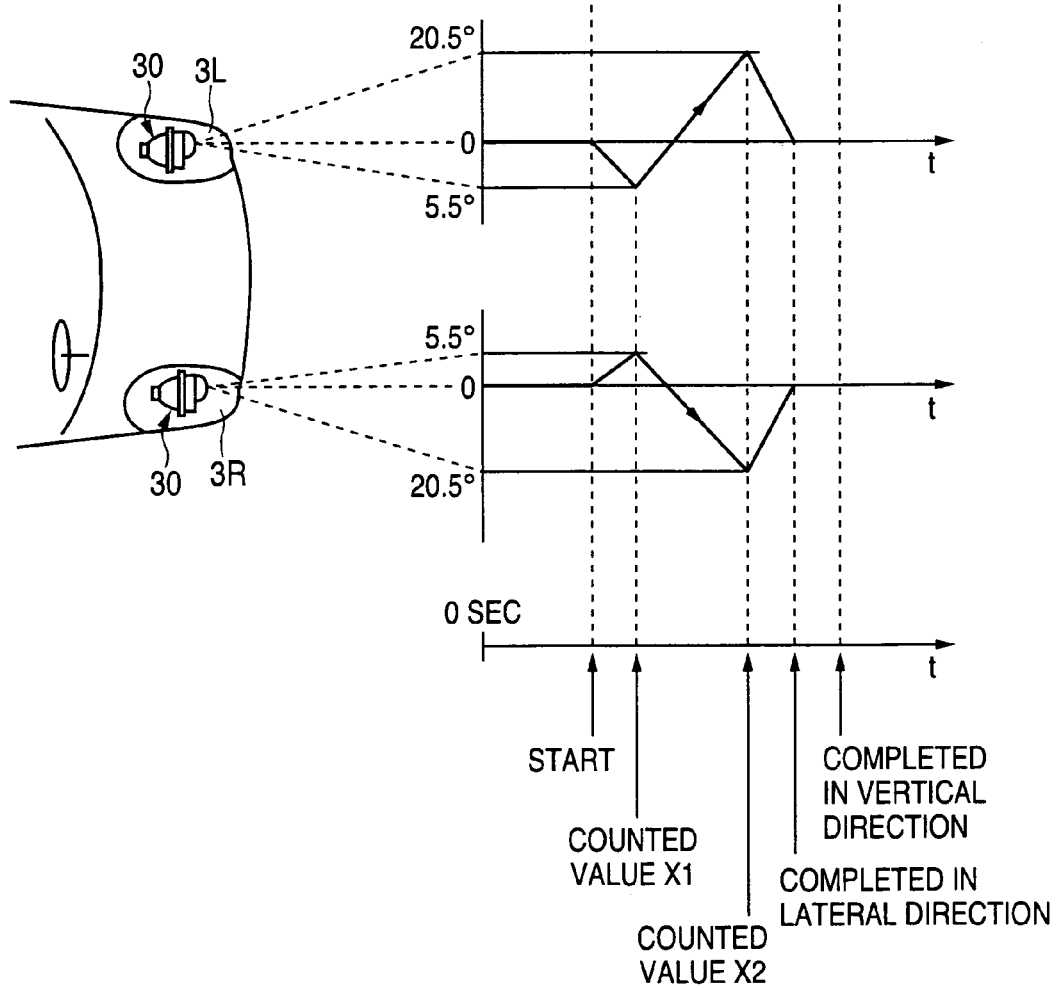

In this case, an initializing process is performed so that the optical axes of the swivel lamps 3R and 3L are set to a predetermined deflection angle position, namely, a reference angle position when the ignition switch S2 is turned on. According to this embodiment of the invention, the right- and left-side swivel lamps 3R and 3L are so designed as to make the deflecting motion at angles ranging from approximately 5.5° inside to approximately 20.5° outside, the angles being deflected from the direction of going straight ahead. FIG. 10 shows a flowchart illustrating the flow of initializing Steps. FIGS. 11A and 11B are timing charts showing the deflecting motion of the projector lamp in the vertical and lateral directions. When the ignition switch S2 is turned on (Step S101), a decision is made on whether the lighting switch S1 is kept in the on-state first (Step S102). In case that the lighting switch S1 is kept in the on-state, the projector lamps 30 are also kept lighting and because there is the possibility of blinding oncoming traffic due to the initializing process, the bracket 31 is tilted downward further than the horizontal line by the leveling mechanism 5 in this case and the initializing process is performed after the optical axis of each projector lamp 30 is directed downward (Step S103). Blinding oncoming traffic is thus prevented even in the case of causing the deflected angle of the projector lamp 30 to be turned to any direction in the initializing process hereinafter. On the other hand, the initialing process is immediately performed in case that the lighting switch S1 is kept in the off-state.

Figure 12A:
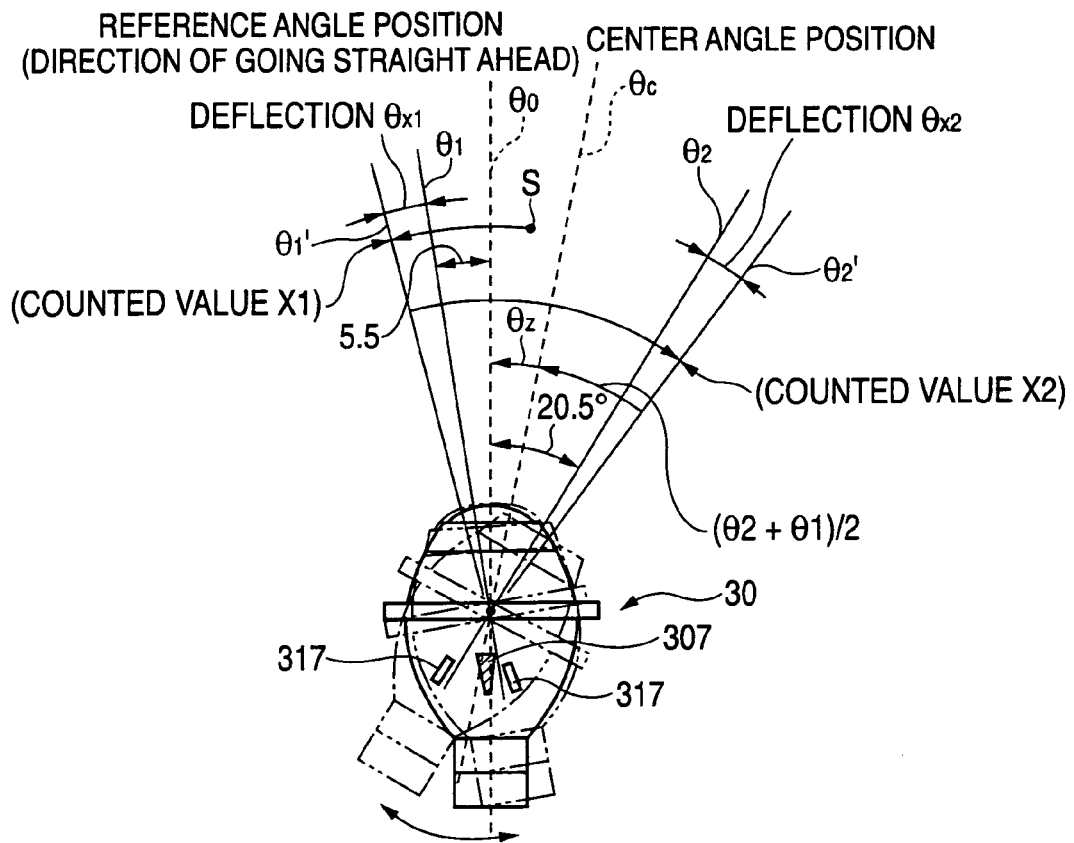
FIGS. 12A and 12B are exemplary diagrams illustrating setting off deflection during the initialization process in a both-side contact system and a one-side contact system.

Referring to FIG. 12A further during the initializing process, the sub-CPU 431 causes the motor driving circuit 434 to drive the brushless motor 42 to rotate in one direction for pivoting each projector lamp 30 inward from the present position of the optical axis in the lateral direction (Step S104). In the following description, the clockwise direction is defined as being positive, whereas the counterclockwise direction as negative. A counted value X1 is then detected (Step S105) when the pivoting of the projector lamp 30 is stopped, that is, when the projector lamp 30 is deflected up to the maximum deflection angle position $\theta_1$ (approximately −5.5° in the direction of going straight ahead) on one side when the protrusion 307 provided on the projector lamp 30 is brought into contact with one of the stoppers 317 provided on the projector lamp 30. Subsequently, the brushless motor 42 is driven to rotate in the opposite direction this time for pivoting the projector lamp 30 outward in the lateral direction rather than the direction of going straight ahead (Step S106). Further, a counted value X2 is detected (Step S107) when the pivoting of the projector lamp 30 is stopped, that is, when the projector lamp 30 is deflected up to a position equivalent to the maximum deflection angle position $\theta_2$ (approximately +20.5° in the direction of going straight ahead) on the opposite side when the protrusion 307 is brought into contact with the stopper 317 on the opposite side. The pivotal motion of the brushless motor 42 in one direction and in the opposite direction in the flow of Steps is made at a relatively high and a constant speed.

Then a center angle position $\theta_c$ as the central position between the maximum deflection angle position $\theta_1$ on one side and the maximum deflection angle position $\theta_2$ on the opposite side is obtained as follows:

$\theta_c = (\theta_2 + \theta_1)/2$

Actually, the calculation of the center angle position $\theta_c$ is made by using the counted value X1 of the pulse signal at the time of making contact with the stopper in the inner direction and the counted value X2 of the pulse signal at the time of making contact with the stopper in the opposite direction (Step S108). In other words, the counted value Xc of the center angle position $\theta_c$ comes to:

$Xc = (X2+X1)/2$

With the center angle position $\theta_c$ as a reference, the angle position directed inward by a predetermined angle $\theta_z$ from the reference is set as a reference angle position $\theta_o$, that is, an angle position in the direction of going straight ahead. More specifically, $\theta_o = \theta_c - \theta_z$.

In the actual calculation, a counted value Xz corresponding to the predetermined angle $\theta_z$ is subtracted from the computed value Xc in order to gain a counted value Xo (Step S109), that is, the reference angle position Xo comes to:

$Xo = Xc - Xz$

Then the brushless motor 42 is driven to rotate in one direction again from the outside contact position at Step S107 and the pivoting of the projector lamp 30 is started in the inner direction (Step S110). At this time, the revolution speed of the brushless motor 42 is set higher than before. Further, the rotation of the brushless motor 42 is continued until the counted value Xo of the reference angle position $\theta_o$ obtained at Step S109 is reached and at a point of time the counted value Xo is reached, the rotation of the brushless motor 42 is stopped (Step S111). Thus the optical axis of each projector lamp 30 can be set at the reference angle position $\theta_o$, that is, in the direction of going straight ahead, so that the setting of the optical axis of the projector lamp 30 can be initialized.

As shown in FIG. 12A, at the maximum deflection angle position $\theta_1$ as a contact position on one side when the projector lamp 30 pivots from the start position S in the inner direction, the actuator 4, the projector lamp 30 and the like undergo deformation because of stress or deformation accompanied with temperature change because of thermal expansion of their material, whereby a deflection angle $\theta_{x1}$ is produced. A deflection angle $\theta_{x2}$ is produced likewise at the maximum deflection angle position $\theta_2$ as a contact position on the opposite side when the projector lamp 30 pivots in the outer direction. Consequently, both the maximum deflection angle positions $\theta_1$ and $\theta_2$ are actually changed to $\theta_{1'}$ and $\theta_{2'}$ because of the deflection angles above.

$\theta_{1'} = \theta_1 - \theta_{x1}$ $\theta_{2'} = \theta_2 + \theta_{x2}$

Therefore, when the calculation of Xc at Step S108 is carried out by using these $\theta_1$ and $\theta_2$, the center angle position $\theta_c$ comes to the following:

$$\theta_c = (\theta_{2'} + \theta_{1'})/2$$
$$= [(\theta_2 + \theta_{x2}) + (\theta_1 - \theta_{x1})]/2$$
$$= [(\theta_2 + \theta_1) + (\theta_{x2} - \theta_{x1})]/2$$

$$= (\theta_2 + \theta_1)/2 + (\theta_{x2} - \theta_{x1})/2$$
$$= \theta_c + (\theta_{x2} - \theta_{x1})/2$$

Therefore, $(\theta_{x2}-\theta_{x1})/2$ makes up an error.

Figure 12B:
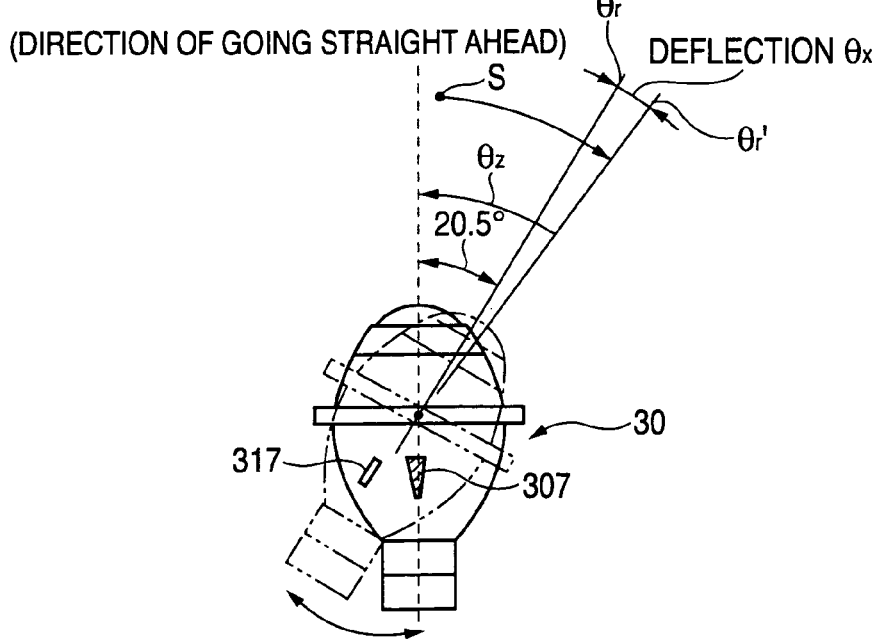

Since half the difference between the deflection angle $\theta_{x2}$ in the outer direction and the deflection angle $\theta_{x1}$ in the inner direction forms such an error as described above, an error in the setting of the center angle position $\theta_c$ as well as in the setting of the reference angle position $\theta_o$ is minimized. Particularly in this example, the deflection angle $\theta_{x1}$ in the inner direction and the deflection angle $\theta_{x2}$ in the outer direction are respectively involved in the same actuator and the same projector lamp and as the revolution speed of the brushless motor 42 is constant during this time, the deflection angles $\theta_{x1}$ and $\theta_{x2}$ become substantially equal to each other. Hence, the error due to the deflection angles $\theta_{x1}$ and $\theta_{x2}$ in this case is reduced to substantially zero. Therefore, assuming that the deflection angle $\theta_x$ in the case of a one-side contact system of FIG. 12B is equal to the deflection angles $\theta_{x1}$ and $\theta_{x2}$ in a both-side contact system, the setting accuracy of the reference angle position $\theta_o$ obtainable in the both-side contact system is seen to be extremely high.

Figure 13:
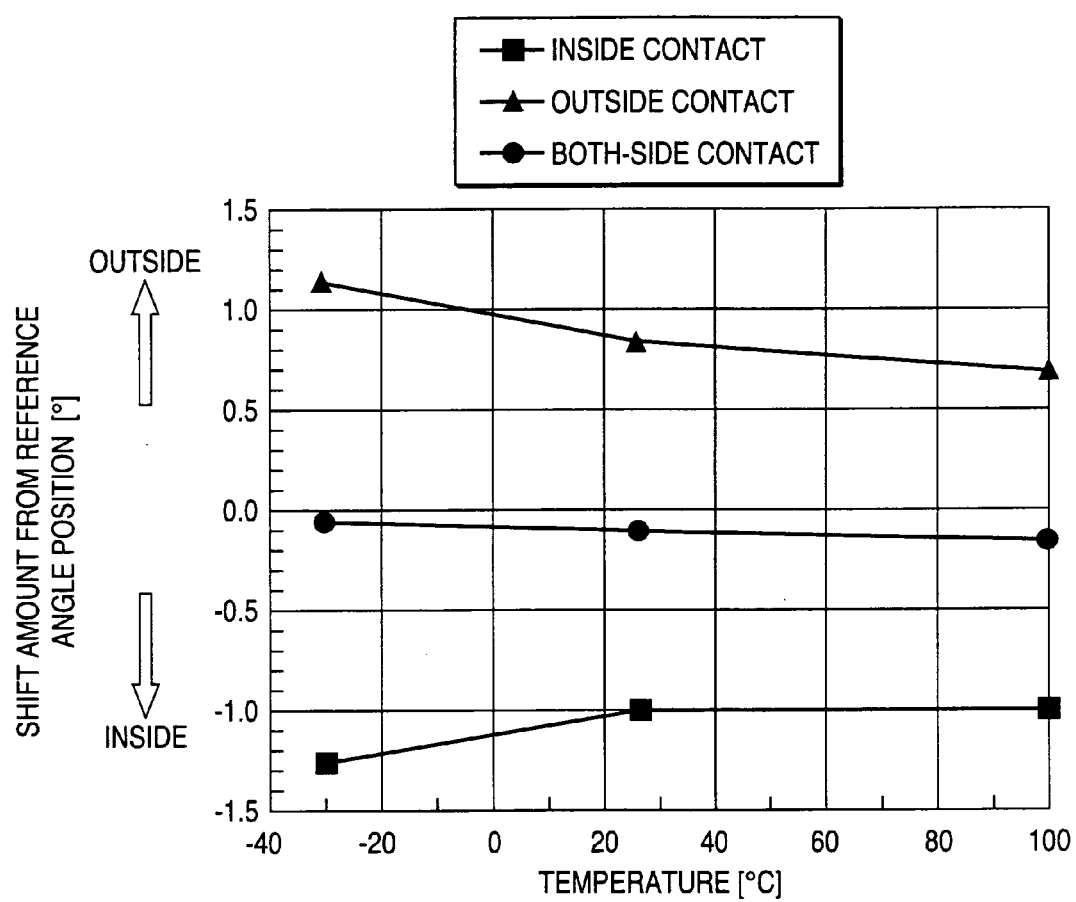
FIG. 13 is a graph referring comparison of positional accuracy with temperature change during the initialization process in the both-side contact system and the one-side contact system.

The adoption of the both-side contact system in which each projector lamp 30 is pivoted in one direction as well as in the opposite direction through the contact action makes it possible to set off the deflection angles produced by the contact action whereby to set the optical axis of each projector lamp 30 accurately to the reference angle position, irrespective of the deflection of the actuator 4 and the projector lamp 30 because of stress and the deflecting variation because of temperature change. Incidentally, FIG. 13 is a graph referring to comparison between a one-side contact system (including the cases of inside and outside contacts) and a both-side contact system that are conventionally practiced in consideration of setting accuracy of a reference angle position with a change in temperature. As is seen from the graphic representation, high setting accuracy is achievable from the both-side contact system regardless of the temperature change.

According to this embodiment of the invention, the projector lamp 30 is pivoted in the inner direction up to making contact with the stopper at a constant speed at the time of initialization first and then pivoted in the outer direction up to making contact with the stopper. This is because by pivoting the projector lamp up to making contact with stoppers on both sides at the constant speed, whereby the deflection angles $\theta_{x1}$ and $\theta_{x2}$ can be made substantially not only equal to each other but also constant thereby. The ignition switch is normally turned off when the automobile is stopped or parked and the optical axes of the projector lamps 30 are often directed toward going straight ahead, that is, to the reference angle position. Consequently, there is great probability that the start position at the time the ignition switch is turned on next is such that the optical axes of the projector lamps are directed to the reference angle position. When each projector lamp 30 is pivoted to making contact with the stoppers on both sides at Steps from S104 to S107, it is preferred to initially pivot the projector lamp inward where the pivoting angle is small and then outward as the pivoting distance becomes shorter than the case of pivoting the projector lamp in the reverse order; the time required to complete the processing is reducible in this way.

Moreover, since the revolution speed of the brushless motor 42 is set higher than before when the reference angle position is set after making contact with the stopper is directed outward, the time required to set the projector lamp to the reference angle position becomes reducible further. In other words, as it is unnecessary to consider the deflection of the projector lamp 30 and the like in this case, the projector lamp can be pivoted at high speed, whereby the setting of the projector lamp to the reference angle position is reducible at Steps from S109 and S110.

As is seen from the timing charts of FIG. 11, since the projector lamps 30 of the swivel lamps 3R and 3L are deflected inward and outward at the time of making contact with the stoppers on both sides, there is the possibility that as cars must keep to the left side of the street in Japan, the left-side swivel lamp 3L blinds oncoming cars when it is deflected inward, whereas the right-side swivel lamp 3R blinds oncoming cars when it is deflected outward while both lamps stay on. In this case, at Step S103 of FIG. 10, as both the optical axes of the swivel lamps 3R and 3L are tilted downward further than the horizontal line by the leveling mechanism 5 while the lamps stay on, blinding oncoming traffic is thus prevented. When the possibility of blinding oncoming traffic is obviated after completion of initial setting of the optical axes of the swivel lamps 3R and 3L in the lateral direction, the optical axes of the swivel lamps 3R and 3L are returned to the horizontal direction by the leveling mechanism 5 (Step S111) and the initial setting of the optical axes thereof in the vertical direction is also completed. According to the embodiment of the invention, the operation of returning the optical axes of the swivel lamps 3R and 3L to the horizontal direction is started at a point of time before the initial setting of the swivel lamps 3R and 3L in the lateral direction is completed in consideration of the time required for the setting thereof in the horizontal direction by the leveling mechanism 5. In case that the swivel lamps 3R and 3L stay off at Step S102, moreover, the optical axes of the projector lamps 30 are titled downward further than the horizontal line and Step S103 is not taken because there is no possibility of such blinding.

According to the embodiment of the invention, the deflection angle in the inner direction is set smaller than the deflection angle in the outer direction with respect to the direction in which the automobile is going straight ahead and each projector lamp 30 is pivoted outside after it is pivoted inside. However, in the case of a headlamp system whose deflection angles in the inner and outer directions are equal, that is, the reference position is set at the center between the deflection angles inside and outside, the order in which the projector lamps are pivoted may be optional.

Moreover, the counting of pulse signals in the up-down counter 437 of the sub-CPU 431 may be carried out by counting pulse signals P1, P2 and P3 of the Hall elements H1, H2 and H3. In case that the period of the pulse signal from the Hall element is extremely short, the counting of pulse signals may be carried out through frequency division.

Although the invention has been applied to the headlamp in which the projector lamps constituting the swivel lamps are deflected horizontally and laterally so as to vary the optical axes by way of example, the invention may also be applicable to a headlamp so arranged that only reflectors are to make a deflecting motion or that auxiliary reflectors provided independently of main reflectors are to make deflecting motion so as to practically vary an irradiation range.

As set forth above, according to the invention, the so-called both-side contact system is adopted wherein the maximum deflection angles are detected by pivoting the headlamp in both one direction and the opposite direction; and the reference angle position setting means for setting the irradiation optical axis at the reference angle position by gaining the reference angle position based on both the maximum deflection angles thus detected. Moreover, the headlamp is pivoted in one direction toward the reference angle position through the steps of detecting the first maximum deflection angle by pivoting the headlamp in one direction until the headlamp is no longer able to pivot in one direction, detecting the second maximum deflection angle by pivoting the headlamp in the opposite direction until the headlamp is no longer able to pivot in the opposite direction and computing the reference angle position of the irradiation optical axis from the first and second maximum deflection angles. Thus it is possible to not only set off the deflection produced in the headlamp and the actuator but also accurately set the optical axis of the headlamp at the reference angle position, whereby the proper control of the AFS accompanied with the driving of the automobile can be secured after the initialization.

What is claimed is:

1. A vehicle headlamp apparatus comprising:
    light distribution control means for deflecting the irradiation optical axis of a headlamp to the right and left in response to the steering angle of a vehicle; and
    reference angle position setting means for detecting the maximum deflection angle when the headlamp is pivoted in one direction as well as the maximum deflection angle when the headlamp is pivoted in the opposite direction and gaining a reference angle position based on both the maximum deflection angles thus detected whereby to set the reference angle position to the irradiation optical axis.

2. A vehicle headlamp apparatus as claimed in claim 1, wherein the light distribution control means is so arranged as to pivot the headlamp with a drive motor, and
    wherein the reference angle position setting means has first detection means for detecting an angle of rotation of the drive motor and second detection means for detecting the pivoting position of the headlamp from the angle of rotation thus detected and is used for gaining the maximum deflection angle from the detected pivoting position of the headlamp and setting the maximum deflection angle at the reference angle position.

3. A vehicle headlamp apparatus as claimed in claim 2, wherein the first detection means includes a sensing element which outputs pulse signals in response to rotation of the drive motor, and the second detection means includes an up-down counter which counts number of the pulses.

4. A vehicle head lamp apparatus according to claim 3, wherein the reference angle position setting means sets the optical axis of said headlamp based on a rotation range obtained from a first counting number of the up-down counter when the drive motor is rotated in one direction and a second counting number of the up-down counter when rotated in the opposite direction.

5. A method of setting the position of the optical axis of a vehicle headlamp apparatus having light distribution control means for deflecting the irradiation optical axis of a headlamp to the right and left in response to the steering angle of a vehicle, comprising the steps of:
    detecting a first maximum deflection angle by pivoting the headlamp in one direction until the headlamp is no longer able to pivot in one direction;
    detecting a second maximum deflection angle by pivoting the headlamp in the opposite direction until the headlamp is no long able to pivot in the opposite direction;
    computing the reference angle position of the irradiation optical axis from the first and second maximum deflection angles; and
    pivoting the headlamp in one direction toward the reference angle position.

6. A method of setting the position of the optical axis of a vehicle headlamp apparatus as claimed in claim 5, wherein the headlamp is pivoted at a predetermined first speed at the step of detecting the first and second maximum deflection angles and wherein the headlamp is pivoted at a second speed higher than the first speed at the step of conforming the headlamp to the reference angle position.

7. A method of setting the position of the optical axis of a vehicle headlamp apparatus as claimed in either claim 5, wherein when a difference in size exists between the first and second maximum deflection angles, the pivoting direction is so controlled that the first maximum deflection angle is made smaller than the second maximum deflection angle.

8. A method of setting the position of the optical axis of a vehicle headlamp apparatus as claimed in either claim 6, wherein when a difference in size exists between the first and second maximum deflection angles, the pivoting direction is so controlled that the first maximum deflection angle is made smaller than the second maximum deflection angle.

* * * * *